United States Patent
Pitois et al.

(10) Patent No.: US 9,170,437 B2
(45) Date of Patent: Oct. 27, 2015

(54) METHOD AND DEVICE FOR CONTROLLING A PHYSICAL PARAMETER OF AN OPTICAL SIGNAL

(75) Inventors: Stéphane Pitois, Corcelles-les-Citeaux (FR); Julien Fatome, Auxonne (FR); Philippe Morin, Dijon (FR); Guy Millot, Quétigny (FR)

(73) Assignees: CENTRE NATIONAL DE LA RECHERCHE SCIENTIFIQUE—CNRS, Paris (FR); UNIVERSITÉ DE BOURGOGNE, Dijon (FR)

( * ) Notice: Subject to any disclaimer, the term of this patent is extended or adjusted under 35 U.S.C. 154(b) by 29 days.

(21) Appl. No.: 14/236,998

(22) PCT Filed: Aug. 2, 2012

(86) PCT No.: PCT/FR2012/051827
§ 371 (c)(1),
(2), (4) Date: Mar. 24, 2014

(87) PCT Pub. No.: WO2013/021122
PCT Pub. Date: Feb. 14, 2013

(65) Prior Publication Data
US 2014/0286603 A1      Sep. 25, 2014

(30) Foreign Application Priority Data
Aug. 5, 2011    (FR) ..................... 11 02472

(51) Int. Cl.
G02F 1/01       (2006.01)
G02F 1/35       (2006.01)
G02F 1/025      (2006.01)

(52) U.S. Cl.
CPC ............. *G02F 1/0126* (2013.01); *G02F 1/011* (2013.01); *G02F 1/0136* (2013.01); *G02F 1/3515* (2013.01); *G02F 1/025* (2013.01)

(58) Field of Classification Search
CPC ...... G02F 1/0126; G02F 1/0136; G02F 1/011
See application file for complete search history.

(56) References Cited

U.S. PATENT DOCUMENTS 8,885,249 B2 * 11/2014 Fatome et al. ............... 359/337
2007/0103684 A1  5/2007 Shahar
2012/0230355 A1  9/2012 Fatome et al.

OTHER PUBLICATIONS

Julien Fatome et al: "Light-by-light polarization control for telecommunication applications". Transparent Optical Networks (ICTON), 2010 12th International Conference On, IEEE, Piscataway, NJ, USA. (Jun. 27, 2010), pp. 1-4, XP031733284, ISBN: 978-1-4244-7799-9.

*Primary Examiner* — Omar R Rojas
(74) *Attorney, Agent, or Firm* — Duane Morris LLP; J. Rodman Steele, Jr.; Gregory M. Lefkowitz

(57) ABSTRACT

The invention relates to a method and device for controlling a physical parameter of an optical signal. According to the invention, a portion of the initial optical signal (SE) having passed through an optical waveguide from the input (24.1) to the output (24.2) thereof, is returned into said optical waveguide (24) using a sequential circulator (25) and an optical amplifier (28), in order to at least partially form the optical control signal (SE2), which counter-propagates relative to said initial optical signal (SE), so as to stabilize, or at the very least control, the physical parameter of said initial optical signal when the latter exits said optical waveguide (24) via the output (24.2) thereof.

12 Claims, 2 Drawing Sheets

METHOD AND DEVICE FOR CONTROLLING A PHYSICAL PARAMETER OF AN OPTICAL SIGNAL

CROSS-REFERENCE TO RELATED APPLICATIONS

This application is a §371 national stage entry of International Application No. PCT/FR2012/051827, filed Aug. 2, 2012, which claims priority to French Patent Application No. 1102472 filed Aug. 5, 2011, the entire contents of which are incorporated herein by reference.

BACKGROUND OF THE INVENTION

The present invention relates to a method and a device for controlling at least one physical parameter of an optical signal.

Such a method and such a device may be used, though not exclusively, to stabilise or at least to control the polarisation state—or any other physical parameter such as a spatial propagation mode or a wavelength—of an optical signal.

A plurality of fundamental physical parameters of an optical signal, such as the polarisation state, the spatial modes and the wavelengths, are capable of varying during the propagation thereof. This is because, when the optical signal is propagated, for example, over several kilometers of optical fibre, the birefringence—even slight birefringence—thereof is sufficient to randomly modify the polarisation state of the signal, which makes it impossible to predict it.

In order to stabilise or at least to control the polarisation state of an optical signal, it is already known to use a dissipation system, such as a Glan polariser, which allows an optical signal having constant polarisation to be obtained at the output. However, this stabilisation is brought about to the detriment of the level of intensity of the signal in that the level of intensity then depends on the polarisation state and therefore fluctuates at the same time as the polarisation fluctuates.

Furthermore, it is also known to use an electronic retrocontrol system which comprises a first control element, an optical control element, which allows any polarisation state to be converted into another polarisation state without any loss. A second element, an electronic element, allows the resultant polarisation state to be measured and analysed in order subsequently to transmit to the first optical element instructions in order to stabilise the final polarisation state at a predetermined state.

Owing to the high response time of the second electronic element, however, the use of this type of electronic prior retrocontrol system is limited to controlling optical signals whose polarisation varies at a low rate.

In order to stabilise, without any random loss of light intensity, an optical signal whose polarisation state varies at any rate, the document of patent FR 2 950 164 has proposed a completely optical control system (therefore, without any electronic components) for the polarisation state of an optical signal. In this document, the optical signal is propagated in an optical waveguide which has Kerr type non-linearity and a weak dispersion of the polarisation modes. Furthermore, there is transmitted into this optical waveguide, on the one hand, via its input, the initial optical signal and, on the other hand, via its output, an optical control signal which is counter-propagated relative to the initial optical signal whose polarisation state is constant and whose spectrum is adapted to minimise the Brillouin scattering in the optical waveguide. In this manner, the non-linear interaction which is produced in the guide between the initial optical signal and the counter-propagating optical signal whose polarisation state is constant allows the constant polarisation state of the output optical signal to be imposed on the initial optical signal when the optical signal is discharged from the optical waveguide via its output.

However, this prior technique has the disadvantage of requiring a source which is capable of generating the counter-propagating optical signal which involves, at the same time, a complex configuration and a high cost. Furthermore, it has been found that, with this prior technique using a counter-propagating optical signal, the control of the polarisation state of the optical signal, after it is introduced into the optical waveguide, is sensitive to the local stresses to which the optical waveguide is subjected, which impairs the stabilisation of the polarisation state.

Furthermore, the document US 2007/103684 A1 describes a completely optical method for controlling a physical parameter of an initial optical signal, in accordance with which there is transmitted into an optical waveguide, via its input, the initial optical signal and, via its output, an optical control signal which is counter-propagated relative to the initial optical signal in order to stabilise or at least to control the physical parameter of the initial optical signal when it is discharged from the optical waveguide via its output, this method being remarkable in that the initial optical signal which has passed through the optical waveguide from the input as far as the output thereof is at least partially returned into the optical waveguide in order to form at least partially the optical control signal.

In this manner, the counter-propagating optical signal is obtained directly from the initial optical signal which has passed through the optical waveguide at least once, which prevents introduction of an independent counter-propagating optical signal by means of a source which is specifically provided for that purpose. A simple optical return element may be sufficient to take a portion of the initial optical signal which has passed through the optical waveguide and to return it into the guide, the remainder of the initial optical signal being recovered at the output of the control device which the guide and the optical return element form.

In this instance, it has been found that, with regard to the polarisation state of an optical signal, the fact of using a portion of the initial optical signal which has passed through the optical waveguide as a counter-propagating optical signal produces a stabilising effect for the polarisation state similar to the effect produced by a counter-propagating signal having a constant polarisation state which is generated by an independent light source. Consequently, in the absence of a constant polarisation state which is intended to be imposed on the initial optical signal, the signal is progressively stabilised towards a particular, specific stable state of the optical waveguide and the initial polarisation state of the initial optical signal. More specifically, it has been found that, in the region of the output of the optical waveguide (located downstream in relation to the propagation direction of the initial optical signal), the optical signal rapidly converges towards one polarisation state from two possible states. In an isotropic optical fibre, those two states correspond to the left-hand and right-hand circular polarisations whilst, in a non-isotropic optical fibre having weak residual birefringence, they remain orthogonal but the precise values thereof depend on multiple parameters of the fibre, in particular the winding, the linear and circular residual birefringences thereof, etc. The optical signal converges towards the state of the two polarisation states that is nearest its initial polarisation state.

Furthermore, the stabilisation of the desired physical parameter—for example, the polarisation state—is not very sensitive to the local stresses to which the waveguide is subjected, which allows even more reliable stabilisation.

According to the method of the document US 2007/103684 A1, the initial optical signal which has passed through the optical waveguide from the input as far as the output thereof is partially returned into the optical waveguide by means of a reflective element which may be, for example, a mirror which is arranged at the output of the optical waveguide, or a reflective treatment which is applied to the output face of the optical waveguide. Therefore, the light intensity of the returned portion of the signal is less than that of the initial optical signal, which does not allow the linear interactions between those signals to be optimised. For example, the transmission coefficient of the mirror is in the order of 5%, which allows substantially equal intensities (95%) to be maintained between the counter-propagating signals in the optical waveguide to the detriment of the light intensity of the stabilised optical signal which has passed through the mirror (5%).

BRIEF SUMMARY OF THE INVENTION

An object of the present invention is to overcome this disadvantage.

To this end, according to the invention, the method for controlling a physical parameter of an initial optical signal, according to which there is transmitted into an optical waveguide:

via its input, the initial optical signal, and,
via its output, an optical control signal which is counter-propagated relative to the initial optical signal and which is formed by a portion of the initial optical signal which has passed through the optical waveguide from the input as far as the output thereof, in order to stabilise or at least to control the physical parameter of the initial optical signal when the signal is discharged from the optical waveguide via its output, is remarkable in that:

the portion of the initial optical signal used as the optical control signal is returned into the optical waveguide by means of a first sequential circulator having an optical waveguide; and
the portion of initial optical signal used as an optical control signal is optically amplified before it is returned into the optical waveguide.

In this manner, as a result of the present invention, the returned portion of the initial signal may be great which allows the interactions between the counter-propagating signals in the optical waveguide to be optimised without, for all that, weakening the stabilised output optical signal.

In this instance, the term "sequential circulator having an optical waveguide" is intended to be understood to be a non-reciprocal optical device which is provided with a plurality of ports and which is capable of redirecting the light from port to port in a sequential manner in a single direction. Such a device provides good optical isolation and a small loss dependent on the polarisation state of the optical signal. In this manner, since the sequential circulator makes it possible to construct a loop between two ports, it is possible to modify the portion of the initial optical signal which has to form the counter-propagating optical signal by making it previously pass through different suitable optical elements.

Consequently, before the portion of the initial optical signal which has passed through the optical waveguide from the input as far as the output thereof is returned into the optical waveguide, it is possible:

to control the parameter thereof and/or
to amplify it optically.

In order to discharge the residual counter-propagating optical signal once it has interacted with the initial optical signal, it is possible to provide a sequential circulator having an optical waveguide relative to the optical waveguide so that, on the one hand, the initial optical signal is transmitted towards the input of the optical waveguide by means of the sequential circulator and, on the other hand, the optical control signal is discharged after passing through the optical waveguide from the output as far as the input thereof.

Furthermore, the Applicant has observed that, when the quantity of energy returned into the waveguide, in the counter-propagating direction, exceeds a threshold value (for example, by means of a highly reflective device or an amplification device), only one of the two polarisation states previously mentioned continues to exist to the detriment of the other and the signal therefore converges towards a single state. One or other of those two individual states can thereby be selected as a single attraction location. Advantageously, therefore, the quantity of energy of the portion of the initial optical signal, which portion has passed through the optical waveguide from the input as far as the output thereof and is returned into the optical waveguide, may be such that the physical parameter of the initial optical signal converges when it is output from the optical waveguide via the output thereof towards a predetermined individual value. It is thereby possible to discriminate between one or other of the predetermined individual values by converting the physical parameter of the control signal in a linear manner (for example, by means of a polarisation controller which is arranged in the loop of the sequential circulator mentioned above).

According to the present invention, the parameter to be controlled may be the polarisation state of the initial optical signal.

The parameter to be controlled may also be a spatial propagation mode of this signal. In this case, the optical waveguide is advantageously multimodal in the sense that it accepts a plurality of spatial propagation modes.

The parameter to be controlled may further be a wavelength of this signal.

In order to carry out the method according to the present invention, it is possible to use a device for controlling a physical parameter of an initial optical signal, the control device comprising, on the one hand, an optical waveguide which is provided to receive, via its input, the initial optical signal and, via its output, an optical control signal which is counter-propagated relative to the initial optical signal and, on the other hand, means for returning into the optical waveguide at least a portion of the initial optical signal which has passed through the optical waveguide from the input as far as the output thereof in order at least partially to form the optical control signal so as to stabilise or at least to control the physical parameter of the initial optical signal when it is discharged from the optical waveguide via its output, this device being remarkable in that the return means comprise a sequential circulator having an optical waveguide and an optical amplifier.

The optical waveguide preferably has a non-zero Kerr type non-linearity coefficient.

The Figures of the appended drawings will clearly show how the invention may be carried out. In those Figures, identical reference numerals indicate similar technical elements.

DETAILED DESCRIPTION OF THE INVENTION

Figure 1:
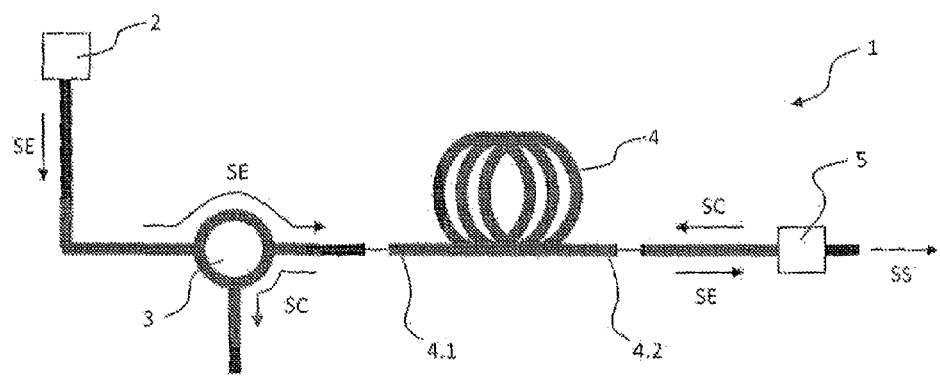
FIG. 1 is a diagram illustrating the operating principle of a known control device.

The known control device 1 which is schematically illustrated in FIG. 1 is intended to allow a physical parameter which characterises an initial optical signal SE, for example, the polarisation state thereof, one of the spatial propagation modes thereof or one of the wavelengths thereof, to be stabilised or at least controlled. To this end, the known control device 1 particularly comprises a three-port sequential circulator 3, an optical waveguide 4 and optical signal return means 5.

The signal SE which may be generated, for example, by a light source 2 and whose physical parameter to be stabilised varies over time may be, for example, a continuous signal, which may be incoherent, or a stream of pulses. In order to prevent any Brillouin retroscattering phenomenon, the spectrum of this initial optical signal SE may be broadened beforehand by means of a phase modulator or by a pulse compressor.

The optical waveguide 4 has a Kerr type non-linearity and preferably a weak dispersion of the polarisation modes (although the control device 1, as a result of the return of a portion of the initial optical signal in order to form the optical control signal, is less sensitive to the dispersion of the polarisation modes than the control device described in document FR 2 950 164), so that the condition of phase matching necessary for exchanging energy between the signals is brought about locally, the stabilisation of the physical parameter of the initial optical signal being connected to a four-wave mixing process.

The initial optical signal SE is transmitted to the sequential circulator 3 in such a manner that the signal SE is introduced via a first port and is discharged via a second port of that circulator. The signal SE is subsequently transmitted into the optical waveguide 4 via the input 4.1 thereof (located upstream of the device 1 in relation to the direction of propagation of the signal SE) so that the signal SE is discharged from the waveguide 4 via the output 4.2 thereof (located downstream of the device 1).

Simultaneously, an optical control signal SC—or pump signal—is transmitted into the optical waveguide 4 via the output 4.2 thereof so that it is counter-propagating with respect to the initial optical signal SE. In this manner, inside the optical waveguide 4, non-linear interactions are produced between the two optical signals SE and SC so that the physical parameter of the optical output signal SS which corresponds to the initial optical signal SE which has passed through the optical waveguide 4 from the input 4.1 to the output 4.2 thereof and which has been discharged therefrom via the output 4.2 thereof (and which has also passed through the return means 5) is stabilised in a particular state.

The optical control signal SC, after being discharged from the optical waveguide 4 via the input 4.1 thereof and therefore already having interacted with the initial optical signal SE so as to stabilise the physical parameter thereof, thus reaches the second port of the circulator 3 in order subsequently to be directed towards the third port thereof, from which it can thus be discharged from the control device 1.

If the physical parameter to be stabilised is the polarisation state of the initial optical signal SE, and as explained in document FR 2 950 164, it has been found that, when the polarisation state of the optical control signal SC is fixed in time, the state of the initial optical signal SE converges towards that fixed state. However, the use of an optical control signal SC having fixed polarisation with respect to the initial optical signal SE having variable polarisation requires an independent light source which is capable of generating that optical signal SC.

In order to dispense with the use of such a source, return means 5 are provided downstream (in relation to the direction of propagation of the initial optical signal SE) of the output 4.2 of the optical waveguide 4. Those return means 5 are arranged more specifically so that the initial optical signal SE, after being discharged from the optical waveguide 4 via the output 4.2 thereof, reaches those means in order to be separated at that location into two separate portions: a first portion which forms the stabilised output signal and a second portion which is intended to be returned into the optical waveguide 4 in order to be propagated in the waveguide in the opposite direction to the direction of propagation of the signal SE and thereby to form at least a portion (preferably the entirety) of the optical control signal SC.

In this manner, when the initial optical signal SE is discharged from the waveguide 4 via its output 4.2, the polarisation state thereof rapidly converges towards one polarisation state from two possible states. In an isotropic optical fibre, those two states correspond to the left-hand and right-hand circular polarisations. In a non-isotropic optical fibre having weak residual birefringence, they remain orthogonal but their precise values depend on multiple parameters of the optical fibre, in particular the winding, the linear and circular residual birefringences thereof, etc. The optical signal converges towards the state of the two polarisation states that is nearest its initial polarisation state.

More specifically, for an isotropic optical fibre, all the initial polarisation states located in the upper hemisphere of the Poincaré sphere converge towards the individual polarisation state located at the upper pole of the sphere whilst all the polarisation states located in the lower hemisphere converge towards the lower pole of the sphere. In this manner, all the polarisation variations of the initial optical signal, in the same hemisphere of the Poincaré sphere, are absorbed and a single polarisation state is obtained at the output of the control device 1. It will thus be noted that, when the polarisation variations cover more than one hemisphere, two polarisation states are obtained at the output.

It has further been observed that, when the quantity of energy reintroduced into the optical waveguide in the counter-propagating direction exceeds a threshold value, one of the two states particular to the optical waveguide is favoured and the polarisation state of the output signal therefore converges towards that single particular state.

Figure 2:
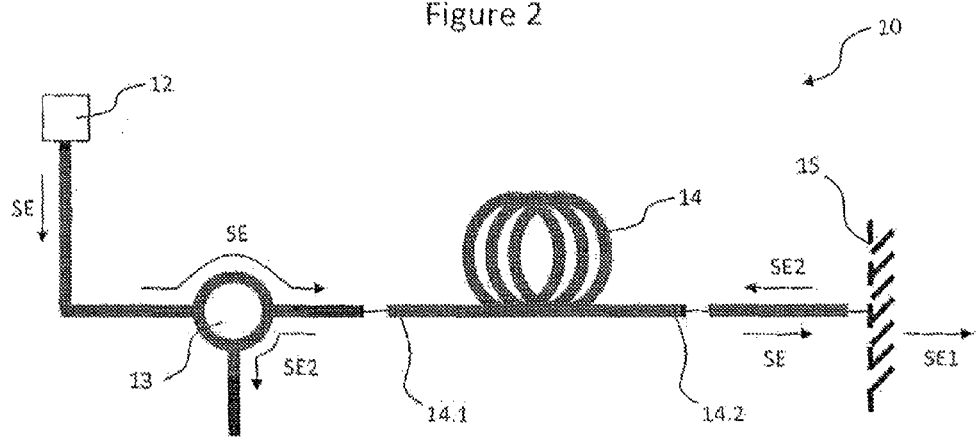
FIG. 2 is a diagram illustrating an embodiment of the known control device of FIG. 1.

FIG. 2 schematically illustrates a known embodiment 10 which applies the operating principle illustrated in FIG. 1. In this known embodiment, the source 12, the sequential circulator 13 and the optical waveguide 14 and the input 14.1 and output 14.2 thereof are similar to the elements designated 2, 3, 4, 4.1 and 4.2 in FIG. 1, respectively. The return means 5 are formed by a mirror 15 whose transmission coefficient is, for example, 5%. To this end, the mirror 15 may be a Bragg or Faraday network which is centred about the wavelength of the signal SE. This mirror 15 is arranged so as, on the one hand, to allow the passage of a first portion SE1 of the initial optical signal SE (for example, 5% thereof) once the signal has passed through the optical waveguide 14 from the input 14.1 as far as the output 14.2 thereof and, on the other hand, to return a second portion SE2 of the initial optical signal SE (for example, 95% thereof) into the optical waveguide 14 so that this second portion SE2 forms the optical control signal which is capable of interacting with the signal SE in the guide 14 in a non-linear manner.

However, it will be noted that, in this known embodiment, since it is significant that the light intensities of the initial optical signal SE and the optical control signal SE2 are near each other, it is necessary for the majority of the signal SE to be transmitted by the mirror 15, which actually brings about a weak recovery of stabilised optical signal (only 5% in the example above).

It will be noted that, in order to fulfil this function of returning the initial optical signal, the return means mentioned above may be formed by any reflective element other than the mirror 15. Those return means may thus be, by way of example, a reflective treatment applied to the output face of the optical waveguide.

Figure 3:
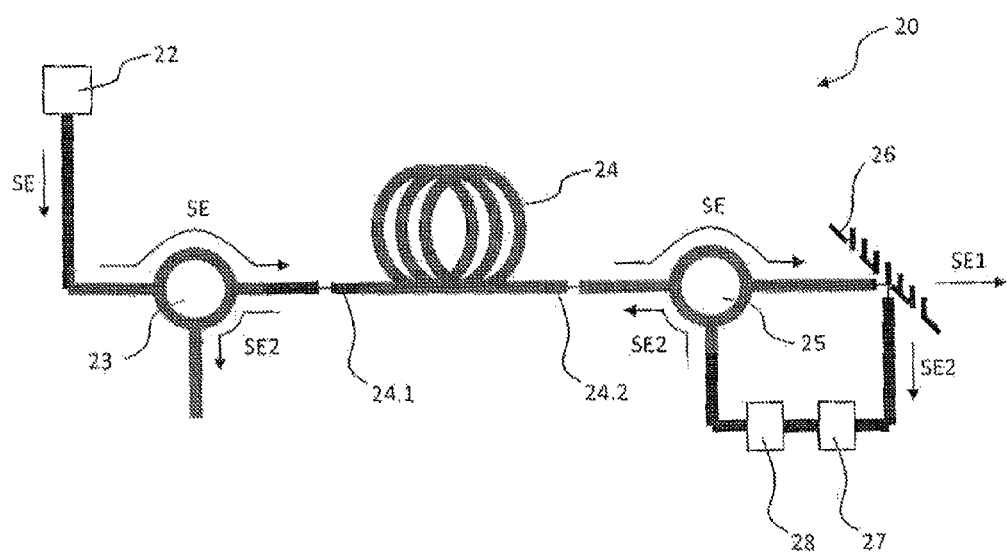
FIG. 3 is a diagram illustrating the control device according to the present invention.

FIG. 3 schematically illustrates an embodiment of the control device 20 in accordance with the present invention. In this embodiment, the light source 22, the sequential circulator 23 and the optical waveguide 24 and the input 24.1 and output 24.2 thereof are similar to the elements designated 2, 3, 4, 4.1 and 4.2 in FIG. 1, respectively. This time, the return means 25 to 28 comprise a three-port sequential circulator 25, a mirror 26 and an optical polarisation controller 27 and an optical amplifier 28.

Those elements 25 to 28 are arranged downstream of the optical waveguide 24 (in relation to the direction of propagation of the initial optical signal SE) so that the initial optical signal SE, after passing through said guide 24, is introduced into the sequential circulator 25 via a first port and is discharged therefrom via a second port in order subsequently to be directed towards the mirror 26.

The mirror 26, unlike the mirror 15 of the control device 10 described above with reference to FIG. 2, may have a high transmission coefficient (for example, 95%). This mirror 26 is arranged so as, on the one hand, to allow the passage of a first portion SE1 of the initial optical signal SE (for example, 95% thereof) once it has passed through the optical waveguide 24 from the input 24.1 as far as the output 24.2 thereof and, on the other hand, to return a second portion SE2 of the initial optical signal (for example, 5% thereof) towards the polarisation controller 27 and the optical amplifier 28, then towards the third port of the circulator 25.

The polarisation controller 27, for example, a Lefèbvre loop device, allows modification of the polarisation of the signal portion SE2 which will act as a counter-propagating control signal, and thus final selection of the polarisation state of the desired fixed output. The optical amplifier 28 subsequently allows the signal portion SE2 polarised in that manner to be amplified so that the light intensity thereof is similar to that of the initial optical signal SE. Once the third port of the circulator 25 has been reached, the signal portion SE2 amplified in this manner is discharged via the first port thereof in order to be directed as far as a location in the optical waveguide 24 so that this second portion SE2 forms the optical control signal which is capable of interacting with the initial optical signal SE in said guide 24 in a non-linear manner. Consequently, two operating modes may be envisaged. More specifically, when the power returned into the optical waveguide is insufficient (less than a predetermined threshold value), the polarisation state of the initial optical signal converges towards two attraction locations (or individual polarisation states), the attraction location towards which it converges effectively being determined by the initial polarisation state of the initial optical signal (that is to say, in accordance with its initial hemisphere). Conversely, when the power returned into the optical waveguide is sufficient (greater than a predetermined threshold value), the polarisation state of the initial optical signal converges towards a single attraction location (or individual polarisation state).

In the embodiment of the invention with a circulator, it will be noted that, owing to the use of a sequential circulator 25, the signal portion SE2 brings about a loop (mirror 26, controller 27, amplifier 28) between two passages in the circulator 25 which allows that portion SE2 to be amplified before it is returned into the guide 24 without impairing, for all that, the quality of the stabilised output signal SE1. In this manner, there may be provided at the output of the control device 20 according to the invention an output signal SE1 having satisfactory light intensity whilst the portion SE2 which is intended to form the control signal and to be amplified by the amplifier 28 may have weaker intensity, taking into consideration that the intrinsic quality of the optical control signal is less decisive for stabilising the initial optical signal SE than the relationship of the light intensities between those two signals.

The selection of the physical parameter to be stabilised, particularly among the polarisation state, a spatial propagation mode and a wavelength, also depends on the envisaged application. To this end, the examples described above for controlling the polarisation state of an optical signal will be able to be adapted for controlling other physical parameters which characterise it.

In this manner, the present invention may be particularly applied to the stabilisation of the polarisation state of a signal in a system based on optical fibres (telecommunications systems via optical fibres, lasers having optical fibres, sensors having optical fibres, metrology, completely optical regenerators, etc.). In this case, the invention allows an increase in the performance levels of such systems using optical fibres to be envisaged whilst reducing the constraints with regard to polarisation.

The invention also allows compensation for the dispersion of the polarisation modes induced by the residual birefringence of the optical fibres to be envisaged, which may constitute a limiting effect for the high-rate transmissions, or allows an improvement in the systems based on coherent detection.

Furthermore, for a wavelength multiplexing application, for example, it is possible to use the control in accordance with the present invention of the polarisation state of a signal having a plurality of wavelengths which polarise different polarisation states, respectively.

Furthermore, in that the present invention allows all the values of a physical parameter characterising an optical signal to be converged towards a single stable value, it allows that single value to be selected without filtering the others, but instead with those values being brought up to the stable value. In this manner, for the control of a wavelength of the signal, it is possible to envisage an application of the present invention involving filtering a wavelength not by eliminating the undesirable wavelengths but instead by bringing those undesirable wavelengths towards the wavelength to be filtered.

Another application which may be envisaged may involve making use of the fact that the value of the physical parameter (for example, the polarisation state) is attracted towards a value among two values which are specific to the optical waveguide in order to produce a polarisation discrimination device, for example, for polarisation triage applications in telecommunications signals which are multiplexed in terms of polarisation.

It will be noted that all the elements of the control device according to the invention, by means of which the optical signals are intended to become propagated, may have fibres. In this manner, the control device is completely composed of fibres which ensures, on the one hand, satisfactory light guiding and, on the other hand, minimisation of the losses of light intensity of the optical signals.

More particularly, with regard to the control of the spatial propagation modes, it will be noted that several of them are capable of co-existing in an optical fibre. The number of spatial modes depends on the parameters of the fibre (index profile, diameter of the core) and the wavelength of the light introduced. Each propagation mode is characterised by its propagation constant, its spatial energy distribution and its polarisation properties. In this manner, in the case of an optical fibre in which two spatial propagation modes may become propagated simultaneously, those two spatial modes which have the same wavelength and the same polarisation state but which have different values of propagation constants, the present invention allows the energy distribution between those two spatial modes to be stabilised.

The invention claimed is:

1. Control method for a physical parameter of an initial optical signal (SE), according to which there is transmitted into an optical waveguide (24):
   via its input (24.1), the initial optical signal (SE), and,
   via its output (24.2) an optical control signal (SE2) which is counter-propagated relative to the initial optical signal (SE) and which is formed by a portion (SE2) of the initial optical signal (SE) which has passed through the optical waveguide (24) from the input (24.1) as far as the output (24.2) thereof,
in order to stabilise or at least to control the physical parameter of the initial optical signal (SE) when the signal is discharged from the optical waveguide (24) via its output (24.2), wherein:
   the portion (SE2) of the initial optical signal (SE) used as the optical control signal is returned into the optical waveguide (24) by means of a first sequential circulator having an optical waveguide (25); and
   the portion (SE2) of initial optical signal (SE) used as an optical control signal is optically amplified before it is returned into the optical waveguide (24).

2. Control method according to claim 1, wherein a partially reflective element (26) is used in order to return into the optical waveguide (24) the portion (SE2) of the initial optical signal (SE) used as the optical control signal.

3. Control method according to claim 1, wherein the physical parameter of the portion (SE2) of the initial optical signal (SE) used as the optical control signal is controlled before it is returned into the optical waveguide (24).

4. Control method according to claim 1, wherein there is provided a second sequential circulator having an optical waveguide (23) upstream of the optical waveguide (24) so that, on the one hand, the initial optical signal (SE) is transmitted towards the input (24.1) of the optical waveguide (24) by means of the second sequential circulator (23) and, on the other hand, the portion (SE2) of the initial optical signal (SE), which portion is used as the optical control signal, is discharged.

5. Control method according to claim 1, wherein the quantity of energy of the portion (SE2) of the initial optical signal (SE), which portion is used as the optical control signal and is returned into the optical waveguide (24), is such that the physical parameter of the initial optical signal (SE) converges when it is output from the optical waveguide (24) via the output (24.2) thereof towards a predetermined individual value.

6. Control method according to claim 1, wherein the physical parameter is the polarisation state.

7. Control method according to claim 1, wherein the physical parameter is a spatial propagation mode.

8. Control method according to claim 7, wherein the optical waveguide (24) is multimodal.

9. Control method according to claim 1, wherein the physical parameter is a wavelength.

10. Control device (20) for a physical parameter of an initial optical signal (SE), the control device (20) comprising:
    an optical waveguide (24) which is provided to receive, via its input (24.1), the initial optical signal (SE) and, via its output (24.2), an optical control signal (SE2) which is counter-propagated relative to the initial optical signal (SE) and
    means for returning (25-28) into the optical waveguide (24) a portion (SE2) of the initial optical signal (SE) which has passed through the optical waveguide (24) from the input (24.1) as far as the output (24.2) thereof in order to form the optical control signal (SE2)
so as to stabilise or at least to control the physical parameter of the initial optical signal (SE) when it is discharged from the optical waveguide (24) via its output (24.2),
wherein the return means (25-28) comprise a sequential circulator having an optical waveguide (25) and an optical amplifier (28).

11. Control device according to claim 10, wherein the return means (25-28) comprise a partially reflective element (26).

12. Control device according to claim 10, wherein the optical waveguide (24) has a non-zero Kerr type non-linearity coefficient.

* * * * *